T

United States Patent
Kadav et al.

(10) Patent No.: US 10,291,485 B2
(45) Date of Patent: May 14, 2019

(54) SYSTEM AND METHOD FOR FAULT-TOLERANT PARALLEL LEARNING OVER NON-IID DATA

(71) Applicant: NEC Laboratories America, Inc., Princeton, NJ (US)

(72) Inventors: Asim Kadav, Plainsboro, NJ (US); Renqiang Min, Princeton, NJ (US); Erik Kruus, Hillsborough, NJ (US); Cun Mu, New York, NY (US)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 15/296,560

(22) Filed: Oct. 18, 2016

(65) Prior Publication Data
US 2017/0111234 A1   Apr. 20, 2017

Related U.S. Application Data

(60) Provisional application No. 62/243,413, filed on Oct. 19, 2015.

(51) Int. Cl.
  *H04L 12/00*  (2006.01)
  *H04L 12/24*  (2006.01)
  *G06N 20/00*  (2019.01)

(52) U.S. Cl.
  CPC .......... *H04L 41/16* (2013.01); *G06N 20/00* (2019.01); *H04L 41/147* (2013.01)

(58) Field of Classification Search
  CPC ...... G06F 17/11; H04L 41/0823; H04L 12/24; H04L 41/16; G06N 99/005
  USPC ................ 709/204, 213, 219, 229, 236, 223
  See application file for complete search history.

(56) References Cited

U.S. PATENT DOCUMENTS

| | | | | |
|---|---|---|---|---|
| 7,421,417 B2* | 9/2008 | Mangasarian | ....... | G06K 9/6269 382/155 |
| 9,397,917 B2* | 7/2016 | Li | ....... | H04L 41/0823 |
| 9,432,257 B2* | 8/2016 | Li | ....... | H04L 41/0823 |
| 9,753,892 B2* | 9/2017 | Raghunathan | .......... | G06F 17/11 |
| 9,760,534 B2* | 9/2017 | Raghunathan | ....... | G05B 13/048 |
| 9,858,534 B2* | 1/2018 | Abu-Mostafa | ....... | G06N 99/005 |
| 9,864,731 B2* | 1/2018 | Baran | ..................... | G06F 17/11 |
| 9,953,271 B2* | 4/2018 | Abu-Mostafa | ....... | G06N 99/005 |

(Continued)

OTHER PUBLICATIONS

Ram et al. Distributed Subgradient Projection Algorithm for Convex Optimization, 2009, IEEE, pp. 3653-3656.*

(Continued)

*Primary Examiner* — Frantz Coby
(74) *Attorney, Agent, or Firm* — Joseph Kolodka

(57) ABSTRACT

A network device, system, and method are provided. The network device includes a processor. The processor is configured to store a local estimate and a dual variable maintaining an accumulated subgradient for the network device. The processor is further configured to collect values of the dual variable of neighboring network devices. The processor is also configured to form a convex combination with equal weight from the collected dual variable of neighboring network devices. The processor is additionally configured to add a most recent local subgradient for the network device, scaled by a scaling factor, to the convex combination to obtain an updated dual variable. The processor is further configured to update the local estimate by projecting the updated dual variable to a primal space.

12 Claims, 5 Drawing Sheets

(56) References Cited

U.S. PATENT DOCUMENTS

| | | | | |
|---|---|---|---|---|
| 2011/0231348 A1* | 9/2011 | Xiao | ................... | G06N 20/00 706/12 |
| 2015/0234779 A1* | 8/2015 | Raghunathan | .......... | G06F 17/11 708/446 |
| 2015/0234780 A1* | 8/2015 | Raghunathan | .......... | G06F 17/11 708/446 |

OTHER PUBLICATIONS

Tsianos et al. Push-Sum Distributed Dual Averaging for Convex Optimization, 51st IEEE Conference on Decision and Control Dec. 10-13, 2012, pp. 3453-3458.*

Rabbat et al., Quantized Incremental Algorithms for Distributed Optimization, IEEE Journal on Selected Areas in Communications, vol. 23, No. 4, Apr. 2005, pp. 798-808.*

Chilimbi, T., et al., "Project Adam: Building an Efficient and Scalable Deep Learning Training System", 11th USENIX Symposium on Operating Systems Design and Implementation, Oct. 2014, pp. 570-582.

Dai, et al., "Petuum: A Framework for Iterative-Convergent Distributed ML", School of Computer Science at Research Showcase, Dec. 2013, pp. 1-11.

Dean, et al., "Large Scale Distributed Deep Networks", NIPS 2012: Neural Information Processing Systems, Dec. 2012, pp. 1-9.

Duchi, et al., "Dual Averaging for Distributed Optimization: Convergence Analysis and Network Scaling", IEEE Transactions on Automatic Control,Mar. 2012, pp. 592-606, vol. 57, No. 3.

Li, et al., "MALT: Distributed Data-Parallelism for Existing ML Applications", EuroSys'15, Apr. 2015, 16 pages.

Li et al., "Scaling Distributed Machine Learning with the Parameter Server", 11th USENIX Symposium on Operating Systems Design and Implementation, Oct. 2014, 582-598.

Tsianos, et al., "Consensus-Based Distributed Optimization: Practical Issues and Applications in Large-Scale Machine Learning", 2012 50th Annual Allerton Conference on Communication, Control, and Computing, Oct. 2012, 8 pages.

* cited by examiner

SYSTEM AND METHOD FOR FAULT-TOLERANT PARALLEL LEARNING OVER NON-IID DATA

RELATED APPLICATION INFORMATION

This application claims priority to provisional application 62/243,413, filed Oct. 19, 2015 and incorporated herein by reference.

BACKGROUND

Technical Field

The present invention relates to machine learning and more particularly improvements to machine learning on networks.

Description of the Related Art

Machine learning methods are being applied across sensors, mobile and personal devices and even geographically distributed data centers. These devices generate and share the data and the computational costs of training a model. However, distributed learning in real world scenarios suffers from two issues. First, the various nodes in a real-world setting may suffer from intermittent network or node failures. For example, geographically separated data centers may suffer from communication delays or dropped packets. Second, the nodes in the distributed system such as the physical sensors may collect data points that are not randomly distributed across the nodes resulting in non-independent and identically distributed (non-i.i.d.) data across the nodes. Data-centers too, often collect non-random data, with each data center receiving data that is biased towards the geography where it is located. Often due to scale, privacy, or lack of a central coordinating resource, randomizing data may not always be possible. As a result, distributed training across these nodes in the presence of biased data at individual machines, based on simple techniques such as averaging of parameters may not work.

SUMMARY

According to an aspect of the present principles, a network device is provided. The network device includes a processor. The processor is configured to store a local estimate and a dual variable maintaining an accumulated subgradient for the network device. The processor is further configured to collect values of the dual variable of neighboring network devices. The processor is also configured to form a convex combination with equal weight from the collected dual variable of neighboring network devices. The processor is additionally configured to add a most recent local subgradient for the network device, scaled by a scaling factor, to the convex combination to obtain an updated dual variable. The processor is further configured to update the local estimate by projecting the updated dual variable to a primal space.

According to another aspect of the present principles, a system is provided. The system includes a plurality of network devices. Each of the plurality of network devices is configured to store a local estimate and a dual variable maintaining an accumulated subgradient. Each of the plurality of network devices is further configured to send a value of the dual variable to neighboring ones of the plurality of network devices and collect values of the dual variable of neighboring ones of the plurality of network devices. Each of the plurality of network devices is also configured to form a convex combination with equal weight from the collected dual variable of the neighboring ones of the plurality of network devices. Each of the plurality of network devices is additionally configured to add a most recent local subgradient, scaled by a scaling factor, to the convex combination to obtain an updated dual variable. Each of the plurality of network devices is further configured to update the local estimate by projecting the updated dual variable to a primal space.

According to yet another aspect of the present principles, a method is provided that is performed in a network having a plurality of network devices. Each of the plurality of network devices includes at least one computing device. The method includes configuring each of the plurality of network devices to store a local estimate and dual variable maintaining an accumulated subgradient. The method further includes, at each of a plurality of iterations, by each of the plurality of network devices, (i) sending a value of the dual variable to neighboring ones of the plurality of network devices and collecting values of the dual variable of the neighboring ones of the plurality of network devices, (ii) forming a convex combination with equal weight of the collected dual variables of the neighboring ones of the plurality of network devices, (iii) adding a most recent local subgradient, scaled by a scaling factor, to the convex combination to obtain an updated dual variable. The method also includes updating the local estimate of each of the plurality of network devices by projecting the updated dual variable to a primal space.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
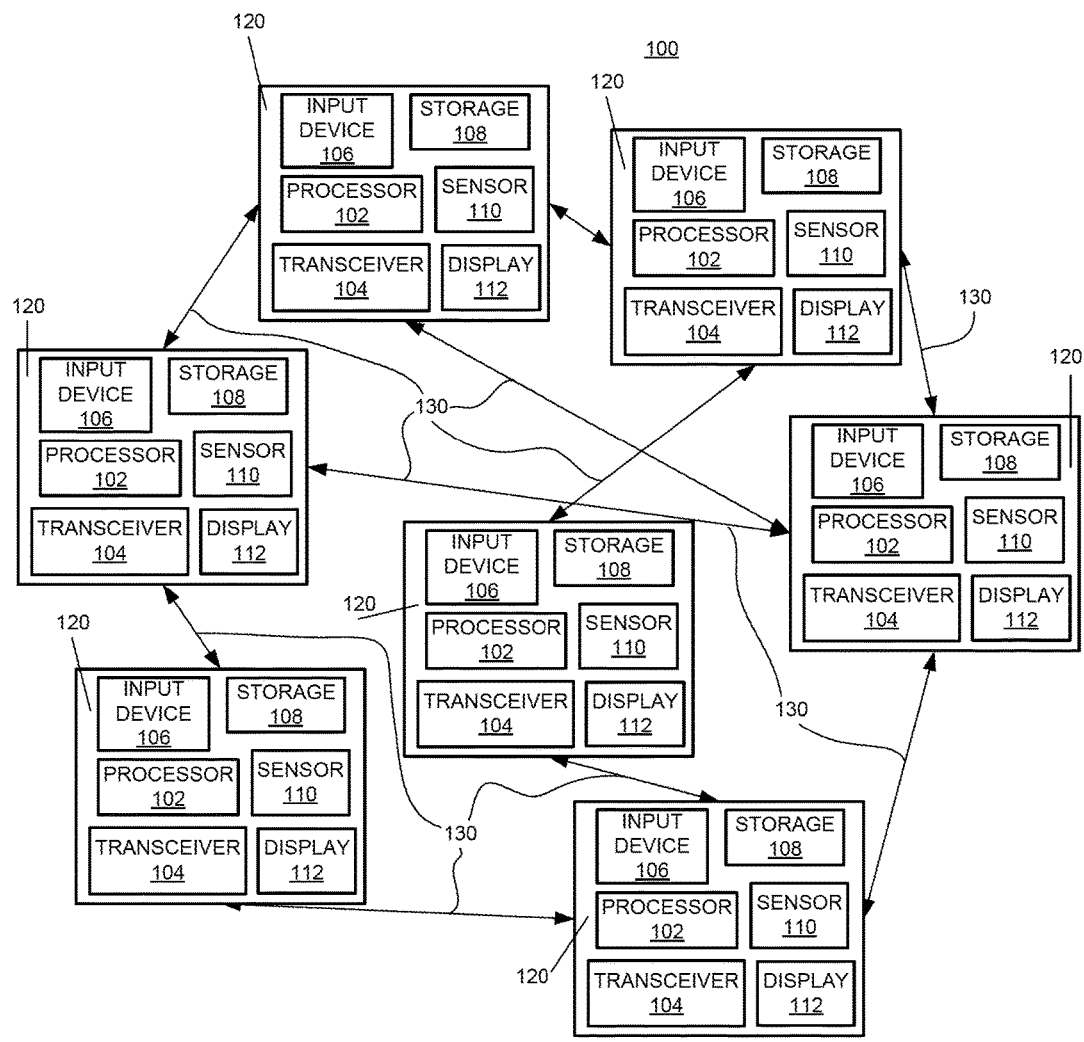
FIG. 1 is a block diagram illustrating a high-level system for networked devices in a network, in accordance with an embodiment of the present invention.

In accordance with the present invention, systems and methods are provided for Enhanced Convergence between network devices on a network.

The most commonly applied paradigm for distributed machine learning is the parameter server approach. The parameter server approach has reasonable computational costs and resets the parameters for all workers ensuring consensus based convergence. However, for many practical embedded sensors there may not be a central reliable server.

Furthermore, if the server fails, the recovery requires using complex protocols. Hence, an alternative approach is to perform distributed consensus optimization methods by using all-reduce style methods. This approach is commonly used with MPI, Hadoop and other map-reduce style frameworks. This model has no separate master and avoids any centralized bottlenecks. Furthermore, a failed network device may simply be removed from the training process. An all-reduce approach is preferred when data is generated at separate physical sources (such as geographically distributed data-centers or sensors).

The all-reduce approach does not require maintaining a set of reliable master servers using complex fault tolerance protocols such as Paxos that are required for master-slave systems. Furthermore, the all-reduce approach only requires communicating gradients for convex problems and reduces high-dimensional model communication costs.

A disadvantage of the all-reduce technique is that it requires communicating with all peers. Hence, for N machines, this results in $O(N^2)$ communication complexity. Because of these prohibitive communication costs, these systems may communicate infrequently that results in poor convergence. To address these issues, second order techniques such as dual-averaging have been proposed that perform sparse communication but still guarantee convergence. However, these methods are not resilient to failures, and cannot handle dynamic change in network topologies. Furthermore, the dual-order methods are expensive to use, and simple averaging is preferred to aggregate the model updates.

Enhanced Convergence makes distributed dual averaging practical. Enhanced Convergence is capable of handling dynamic communication networks, since each network device in Enhanced Convergence only needs to know about their neighborhood in the network based on received model updates, rather than global properties of the entire network. As a result, Enhanced Convergence can handle real-world intermittent failure scenarios. Enhanced Convergence also provides several practical performance optimizations that make it faster than existing dual methods. Enhanced Convergence is the first implementation to show that a dual method can work as fast as a primal method. Furthermore, these optimizations can also be applied to other dual-order methods that are considered impractical due to their slow speeds.

Enhanced Convergence is designed to support multiple replicas across different network devices training on different data. After training an example (or a batch of examples), these network devices send model information to one-another and learn using Enhanced Convergence's dual averaging method. Hence, with Enhanced Convergence each machine computes a new model based on the data examples, and performs a push operation to its peers as decided by the network topology. It then performs a reduce operation over the received model updates and proceeds to train over more data.

In Enhanced Convergence, each machine maintains a per-sender queue to receive the model information that can be written to by the peers using shared memory protocols. This design of using dedicated per-sender queues allows the senders to write to its receivers without any coordination. Hence, when using one sided protocols, such as remote direct memory access or GPUDirect, this operation can be performed asynchronously without any synchronization from even the receiving network device's hardware. This architecture ensures one-sided communication and scales better as the number of network devices increase. Furthermore, this style of communication is optimal for dual-averaging methods that send updates using one-sided undirected graphs and do not need to perform a consensus operation to ensure convergence.

Referring now in detail to the figures in which like numerals represent the same or similar elements and initially to FIG. 1, a network system 100 of networked devices 120 is illustratively shown. The network system 100 includes more than one network device 120. In one embodiment, the network device 120 may include a remote sensor. The remote sensor when combined with other remote sensors in the network would create a remote sensor system. The remote sensor system would give a robust and redundant coverage by having the sensors sharing data with neighboring sensors. In another embodiment, the network device 120 may include mobile devices, cell phones, personal computers, data centers or any combination of these and other networkable items.

The network device 120 may include one or more processors 102. The processor 102 could process sensor or input data of the network device 102. The processor 102 could process the data received by the network device 120 from another network device 102. The network device 120 may include one or more displays 112. The network device 120 may include one or more input device 106. The input device could be used to accept user commands or data into the network device 102.

The network device 120 may include one or more sensors 110 for making different measurements. The measurements may include gas concentration, pressure, temperature, wind speed, wind direction, speed, acceleration, etc. In one embodiment, the sensor 110 may include an optical sensor, an infrared (IR) sensor or a camera. The sensor 110 may include an accelerometer or other motion sensor. The sensor 110 may include an electrochemical gas sensor or other gas sensor. The sensor 110 may include a thermocouple, a thermistor, a resistance thermometer, a silicon bandgap temperature sensor or other temperature sensor.

The network device 120 may include a transceiver 104. In one embodiment, the transceiver 104 may be coupled to a global position system (GPS) to generate a position of the network device 120 relative to other network devices and a common coordinate system. The GPS generated network map could be used to help in placement of new network devices 120 in areas with fewer network devices 120. The transceiver 104 may be equipped to communicate with a cellular network system. In this way, the network devices position can be computed based on triangulation between cell towers base upon signal strength or the like. In one embodiment, the cellular network system may be the communication link 130 between the network devices 120. The transceiver 104 may include a WIFI or equivalent radio system, local area network, wide area network, or other network communication system.

The network device 120 may include memory storage 108. The memory storage 108 may include solid state or soft storage and work in conjunction with other systems on the network device 120 to record data, run algorithms or programs, control the network device, etc. The memory storage 108 may include a Read Only Memory (ROM), random access memory (RAM), or any other type of memory useful for the present applications. In one embodiment, the memory storage 108 may include the Enhanced Convergence software for improved network data convergence.

Figure 2:
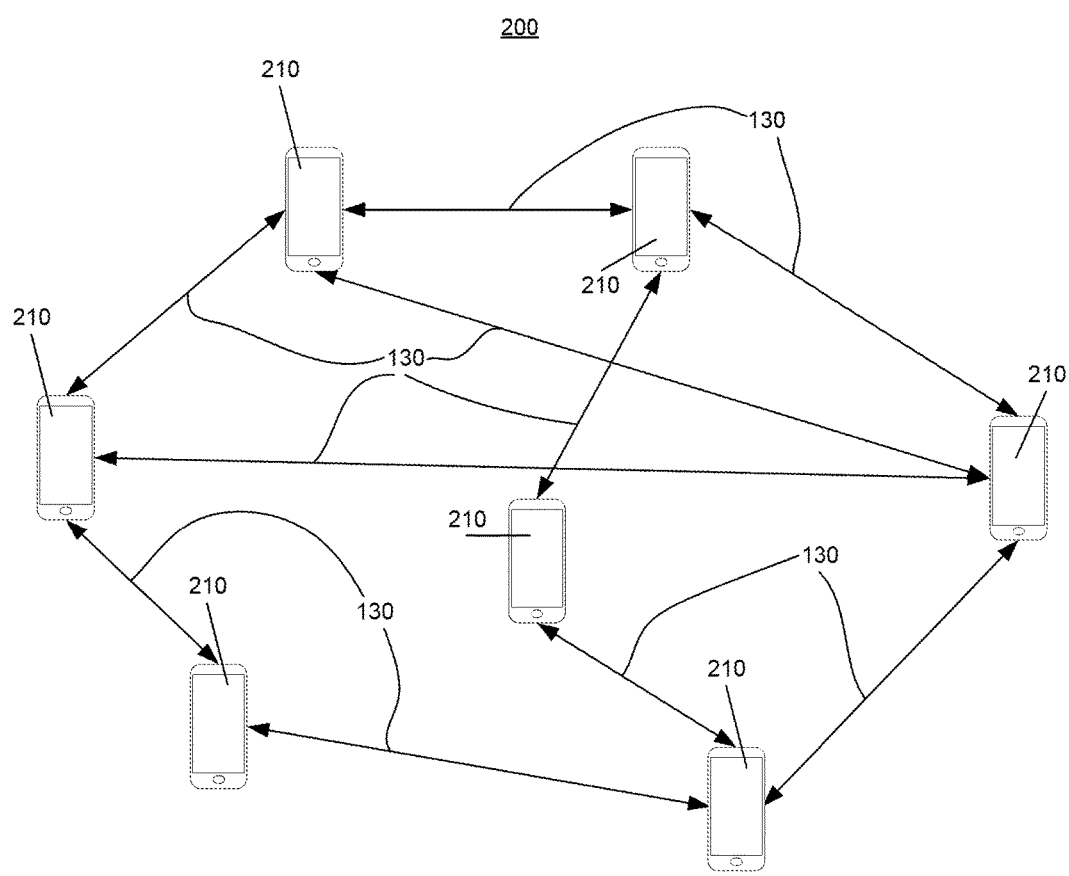
FIG. 2 is a block diagram illustrating a system for cell phones connected in a network, in accordance with an embodiment of the present invention.

Referring to FIG. 2, a network system 200 is illustratively depicted, in accordance with an embodiment of the present invention. The network system 200 may include cell phones 210. The cell phones 210 may send data and information over a communication link 130. The communications link 130 may include a cellular based or a WWI based link. All of the cell phones 210 have active communication links 130 with more than one other cell phone 210. The cell phones 210 are exchanging information and data and processing the information and data along with information and data it is producing. The combining and processing of information and data may be accomplished with the Enhanced Convergence software to increase the speed and efficiency of the processing and protect against cell phones 210 going offline and the communication link 130 lost.

Figure 3:
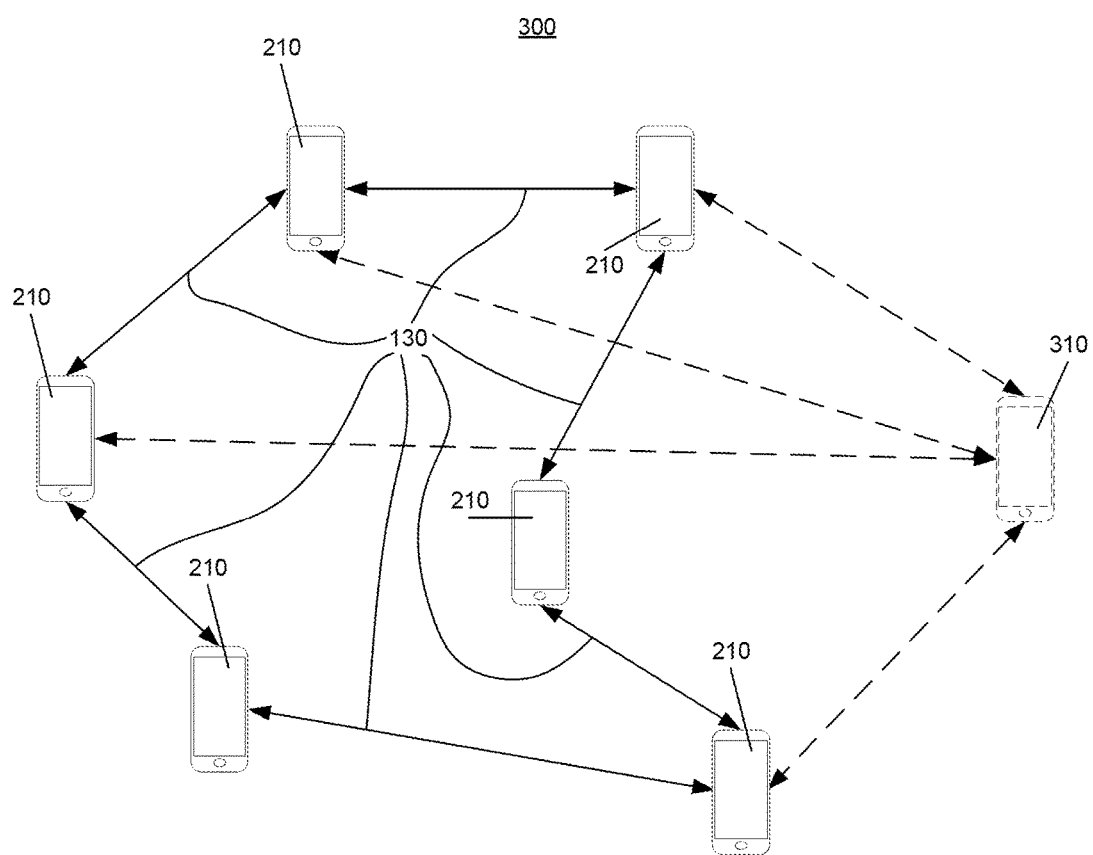
FIG. 3 is a block diagram illustrating a system for cell phones connected in a network after a cell phone goes offline, in accordance with an embodiment of the present invention.

Referring to FIG. 3, a new network system 300 is illustratively depicted, in accordance with an embodiment of the present invention. The new network system 300 is the network based on the network system 200 after an offline cell phone 310 goes offline. The communication links 130 that previously connected the offline cell phone 310 are lost. The remaining cellphones 210 still have communication links 130 to at least one other cell phone 210. This allows the network to remain active with all the remaining cellphones contributing information and data to the network. The remaining cell phones 210 running the Enhanced Convergence software will quickly recover from the loss of the offline cell phone 310 information and data because the Enhanced Convergence software only needs the cell phones 210 to be in communication with neighboring cell phones 210 and not all the cell phones 210 on the network.

Figure 4:
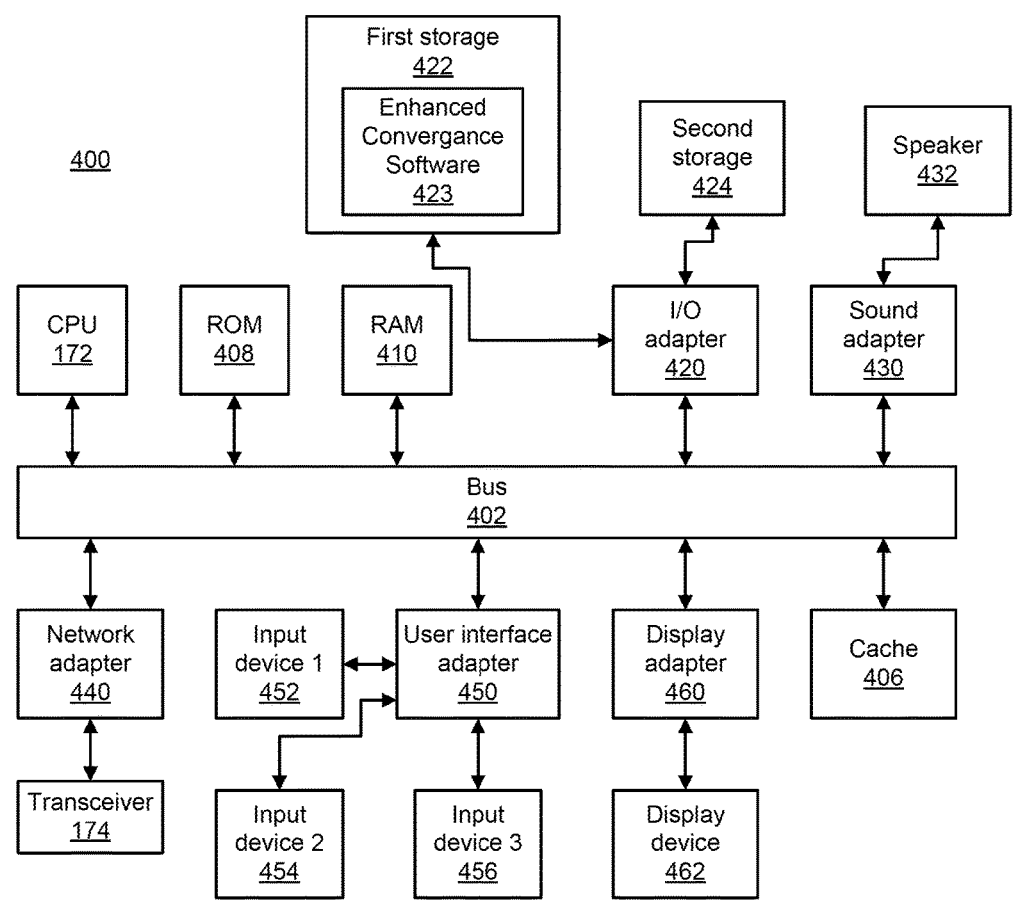
FIG. 4 is a block diagram illustrating a network device for a network system, in accordance with an embodiment of the present invention.

Referring to FIG. 4, an exemplary computer system 400 is shown which may represent the network device 120 (FIG. 1), in accordance with an embodiment of the present invention. The computer system 400 includes at least one processor (CPU) 102 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices. In one embodiment, the first storage device 422 or the second storage device 424 may include enhanced convergence software 425. The enhanced convergence software 425 may be able converge the disparate data of the network devices 120 on the network to get all the network devices 120 using a uniform data set.

A speaker 432 may be operatively coupled to system bus 402 by the sound adapter 430. A transceiver 104 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a sensor, a keyboard, a mouse, a keypad, a joystick, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the computer system 400 may also include other elements (not shown), as readily contemplated by one of skill in the art, as well as omit certain elements. For example, various other input devices and/or output devices can be included in computer system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 400 are readily contemplated by one of ordinary skill in the art given the teachings of the present invention provided herein.

Figure 5:
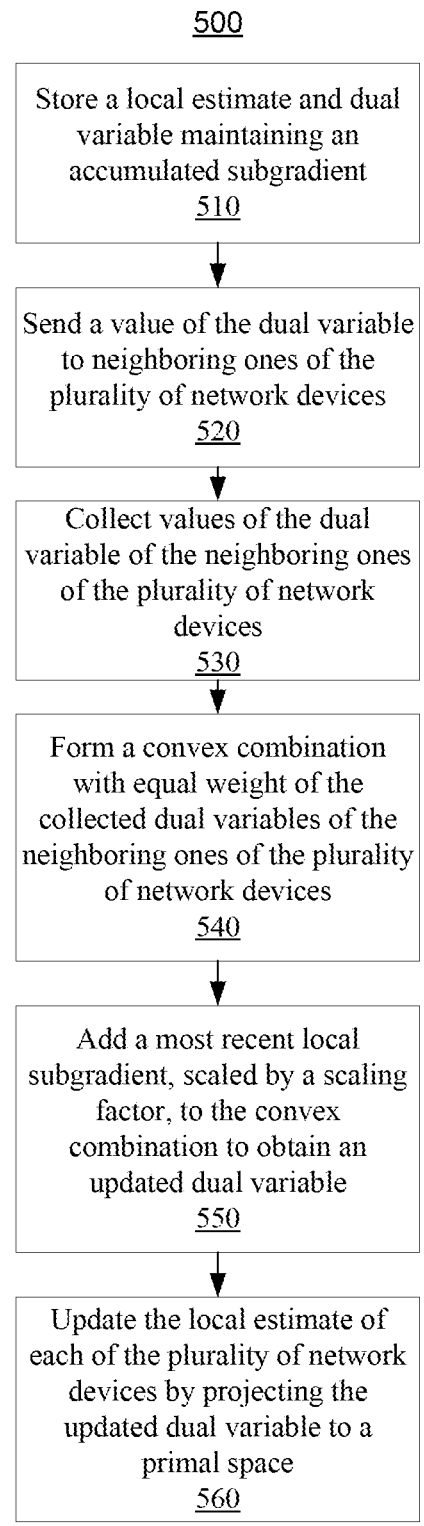
FIG. 5 is a flow diagram illustrating a method for enhanced convergence in a network, in accordance with an embodiment of the present invention.

Referring to FIG. 5, a flow chart for a method 500 of enhanced convergence on a network system 100 is illustratively shown, in accordance with an embodiment of the present invention. It is to be appreciated that the steps of method 500 are performed by each network device 120 of network system 100. In block 510, store a local estimate and dual variable maintaining an accumulated subgradient. In block 520, send a value of the dual variable to neighboring ones of the plurality of network devices. In block 530, collect values of the dual variable of the neighboring ones of the plurality of network devices. In block 540, form a convex combination with equal weight of the collected dual variables of the neighboring ones of the plurality of network devices. In block 550, add a most recent local subgradient, scaled by a scaling factor, to the convex combination to obtain an updated dual variable. In block 560, update the local estimate of each of the plurality of network devices by projecting the updated dual variable to a primal space.

Enhanced Convergence method is shown step-by-step. In this method, each network device 120 $i$ keeps a local estimate $x_i$ and a dual variable $z_i$ maintaining an accumulated subgradient. At iteration t, to update $z_i$ each network device 120 needs to collect the z-values of its neighbors, forms a convex combination with equal weight of the received information and adds its most recent local subgradient scaled by $|N(i)|+1$. After that, the dual variables $z_i$ is projected to the primal space to obtain $x_i$.

To implement the Enhanced Convergence method, each network device 120 only needs to know its neighborhood information, which makes the method robust to any changes in the network topology, which may occur frequently from network device 120 or edge failures. As possibly inferred from the name, Enhanced Convergence method makes the distributed dual averaging (DDA) method robust, based on the theory of random walk over undirected graph. However, the original DDA method heavily relies on the fact that the consensus matrix is doubly stochastic, which requires regular network device 120 communication graphs. This requirement restricts the DDA method from being fully distributed, especially when facing changes in network topology. Specifically, whenever a communication link 130 or network device 120 failure happens, the DDA method has to stop the method and reconfigure its consensus matrix using a central master network device, which makes it impractical in real settings such as in the case of peer-to-peer sensors. To overcome this difficulty, Enhanced Convergence method self-adjusts the consensus matrix at a feasible local level, by using a row stochastic matrix plus a gradient scaling trick.

Enhanced Convergence requires only that the communication matrix P is row stochastic, which allows non-regular communication graphs.

Enhanced Convergence Method

---

Input: a predetermined nonnegative non-increasing sequence {α(t)}.
Initialization: $x_i(0) = z_i(0) = 0$; for all $i \in [n]$.
for t = 0, 1, 2, . . . , do
  1. Subgradient calculation:
    $g_i(t) \in \partial f_i(x_i(t))$, for each agent i.    (1.1)
  2. Dual updates:

$$z_i(t+1) = \frac{\sum_{j \in N(i) \cup \{i\}} z_j(t) + g_i(t)}{|N(i)| + 1}, \qquad (1.2)$$

for each agent i.
  3. Primal updates:

$x_i(t+1) = P_X[-\alpha(t)z_i(t+1)] :=$     (1.3)
    $\arg\min_{x \in X} x + \alpha(t)z_i(t+1)^2$, for each agent i.

end for

---

For notational convenience, we will define the matrix $P \in \mathbb{R}^{n \times n}$ with $P_{ij}$ being $$\frac{1}{|N(i)+1|}$$

for $j \in N(i) \cup \{i\}$ and 0 otherwise. Clearly P is a row stochastic matrix, i.e. the sum of very row of P equals 1. We will also define the vector $\pi \in \mathbb{R}^d$ with the i-th entry $\pi_i$ being $$\frac{|N(i)|+1}{\beta},$$

where $\beta := 2|V|+|E|$. It can easily verified that π is a probability vector, i.e. $\pi_i > 0$ and $\Sigma_{i \in [n]} \pi_i = 1$. With these notations, we are able to express (1.2) in a terser way. Imagine $X \subseteq \mathbb{R}$, such that $x_i(t)$, $z_i(t)$, and $g_i(t)$ are now all scalars. Then we can rewrite the update (1.2) as $$z(t+1) = Pz(t) + \frac{1}{\beta}\mathrm{diag}(\pi)^{-1}g(t) = \frac{1}{\beta}\sum_{s=0}^{t} P^s \mathrm{diag}(\pi)^{-1}g(t-s), \qquad (1.4)$$

with $z(t)=(z_1(t), z_2(t), \ldots, z_n(t))^T$ and $g(t)=(g_1(t), g_2(t), \ldots, g_n(t))^T$. As we need each network device 120 to play the same role in the system, from (1.4), it is quite reasonable to require $P^\infty \mathrm{diag}(\pi)^{-1} = \mathbb{1}_{n \times n}$ where $$P^\infty := \lim_{t \to \infty} P^t \text{ and } \mathbb{1}_{n \times n}$$

is the n by n matrix with all entries as one. Indeed, we can verify this requirement by the close connection between P and π, as revealed in the following lemma, which can be regarded as a direct consequence of results for random walk under undirected graph.

For our Enhanced Convergence implementation, on every network device 120 $k$, we loop over the local training examples. For every iteration t, we choose an example i, and calculate the local gradient $g_i$ and update the current model $x_k^t$. In distributed optimization across multiple network devices 120, we perform a push operation of the computed gradients and perform a reduce operation on the received gradients. In the reduce step, we sum any incoming gradient contributions (dual vectors) as $z_k^{t'} = \Sigma_{j \in I_k} z_j$ and incorporate gradient $g_i$ into dual $z_k$ as $$z_k^{t+1} = \frac{z_k^{t'} + g_i}{|I_k| + 1}.$$

After processing a batch of examples on every machine (about 500-5000), we push dual gradient $z_k^{t+1}$ k via out-edges $O_k$. We also choose learning rate $n_k^t$ and apply the dual gradient $z_k^{t+1}$ as $x_k^{t+1} = -n_k \cdot z_i$. Finally, each network device 120 also maintains and updates the running average or the consensus model as $$\hat{x}_k^{t+1} = \sum_{i=1}^{t+1} \frac{x_k^i}{(t+1)} = \frac{t}{t+1}\hat{x}_k^t + \frac{1}{t+1}x_k^{t+1}.$$

To improve performance, we perform the following three optimizations.

First, instead of calculating the full gradient on every iteration, we only compute the sparse gradient and separately correct the regularizer.

Second, instead of sending z (or w for model averaging) after every update step to all other network devices 120, we send it infrequently to reduce communication costs. Each network device 120 locally processes examples (usually 500-5000), and then communicates z. We adjust the learning rate parameter n to account for the batched communications.

Third, we maintain a running sum average over the dual, and only compute this sum only during reduce (incoming z parameters). Furthermore, in our asynchronous implementation if there are no incoming dual variables (z), we skip updating the average.

We find that the above optimizations give us significant speedups allowing the dual space methods that we implement, to operate as fast as primal space methods.

Distributed learning over a large number of distributed sensors or geographically separated data centers suffers from sampling biases and communication link 130 failures. Existing dual averaging approaches are slow, and may not converge correctly in the presence of communication link 130—failures, which are fairly common in real world deployments. This happens because these methods such as DDA make the assumption that the communication/transition matrix P is doubly stochastic, which requires regular network device 120 communication graphs.

Thus, the Enhanced Convergence method of the present invention is a distributed learning method that is robust to failures. Enhanced Convergence requires only that the communication matrix P is row stochastic, which allows non-regular communication graphs. This type of graph structure then allows an easy weighting scheme to maintain convergence to the correct fixed points. Analysis shows the method of the present invention has O(1/pt) convergence for non-smooth convex problems. Evaluations show that Enhanced Convergence method of the present invention converges as fast as primal averaging methods and provides smooth convergence.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A network device, comprising:
a processor configured to:
store a local estimate and a dual variable maintaining an accumulated subgradient for the network device;
collect values of the dual variable of neighboring network devices;
form a convex combination with equal weight from the collected dual variable of neighboring network devices;
add a most recent local subgradient for the network device, scaled by a scaling factor based on a number of neighboring network devices plus 1, to the convex combination to obtain an updated dual variable;
update the local estimate by projecting the updated dual variable to a primal space; and
send the dual variable of the network device to neighboring network devices when a threshold criterion is met, the threshold criterion includes at least one of a time since last send, a number of iterations since last send, and a dual variable file size change since last send.

2. The network device of claim 1, further comprising at least one sensor for collecting sensor data.

3. The network device of claim 2, wherein the at least one sensor includes at least one selected from the group consisting of an imaging sensor, a temperature sensor, a proximity sensor, and gas concentration sensor.

4. The net work device of claim 1, further comprising a memory that supports remote direct memory access.

5. A system, comprising:
a plurality of network devices, each configured to:
store a local estimate and a dual variable maintaining an accumulated subgradient;
send a value of the dual variable to neighboring ones of the plurality of network devices and collect values of the dual variable of neighboring ones of the plurality of network devices;
form a convex combination with equal weight from the collected dual variable of the neighboring ones of the plurality of network devices;
add a most recent local subgradient, scaled by a scaling factor based on a number of neighboring network devices plus 1, to the convex combination to obtain an updated dual variable;
update the local estimate by projecting the updated dual variable to a primal space; and
send the dual variable of the network device to neighboring network devices when a threshold criterion is met, the threshold criterion includes at least one of a time since last send, a number of iterations since last send, and a dual variable file size change since last send.

6. The system of claim 5, wherein each of the plurality of network devices further comprises a memory configured to support remote direct memory access.

7. A method performed in a network having a plurality of network devices, each of the plurality of network devices including at least one computing device, the method comprising:
configuring each of the plurality of network devices to store a local estimate and dual variable maintaining an accumulated subgradient;
at each of a plurality of iterations, by each of the plurality of network devices, (i) sending a value of the dual variable to neighboring ones of the plurality of network devices only when a threshold criterion is met, the threshold criterion includes at least one of a time since a last send, a number of iterations since the last send, and a dual variable file size change since the last send, and collecting values of the dual variable of the neighboring ones of the plurality of network devices, (ii) forming a convex combination with equal weight of the collected dual variables of the neighboring ones of the plurality of network devices, (iii) adding a most recent local subgradient, scaled by a scaling factor based on a number of neighboring network devices plus 1, to the convex combination to obtain an updated dual variable;

updating the local estimate of each of the plurality of network devices by projecting the updated dual variable to a primal space.

8. The method of claim 7, wherein at least some of the plurality of network devices include at least one sensor for collecting sensor data.

9. The method of claim 8, wherein the at least one sensor is selected from the group consisting of an imaging device, a temperature sensor, a proximity sensor, and gas concentration sensor.

10. The method of claim 7, further comprising computing a sum average of the dual variable only when a threshold criterion is met, the threshold criterion relating to limiting computation of the sum average to a receiving time period of the dual variable from the neighboring ones of the plurality of network devices.

11. The method of claim 7, further comprising accessing a memory in at least some of the neighboring ones of the plurality of network devices.

12. The method of claim 11, wherein accessing the memory uses a remote direct memory access.

* * * * *